G. G. EKONOMOU.
FAUCET.
APPLICATION FILED OCT. 31, 1914.

1,145,128.

Patented July 6, 1915.

Inventor
G. G. EKONOMOU

UNITED STATES PATENT OFFICE.

GUST G. EKONOMOU, OF KALAMAZOO, MICHIGAN.

FAUCET.

1,145,128. Specification of Letters Patent. Patented July 6, 1915.

Application filed October 31, 1914. Serial No. 869,693.

*To all whom it may concern:*

Be it known that I, GUST G. EKONOMOU, a citizen of the United States, residing at Kalamazoo, in the county of Kalamazoo and State of Michigan, have invented certain new and useful Improvements in Faucets, of which the following is a specification, reference being had to the accompanying drawings.

This invention relates to new and useful improvements in faucets and more particularly to a combined cold and hot water faucet, the main object of the present invention being the provision of a faucet of this character where either hot or cold water may be drawn therefrom or both hot and cold water drawn at the same time.

Another object of the present invention is the provision of a faucet of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawing forming a part of this application, Figure 1 is a longitudinal sectional view of a faucet, constructed in accordance with my invention. Fig. 2 is a side elevation of a valve member. Fig. 3 is a transverse sectional view taken on the line 3—3, Fig. 2. Fig. 4 is a transverse sectional view taken on the line 4—4, Fig. 2; and Fig. 5 is a transverse sectional view taken on the line 5—5, Fig. 2.

Referring more particularly to the drawing, 1 indicates the body of the faucet proper and extending from one side thereof are the inlet pipes 2 and 3, the pipe 2 being connected to the cold water and the pipe 3 connected with the hot water. Each one of these pipes, as illustrated, leads into the body of the faucet which may be of any well known conventional type and formed of any material suitable for the purpose. The body, as illustrated, is preferably hollow and is provided at diametrically opposite points with suitable openings which are generally indicated by the numerals 4 and 4' and 5 and 5', the numerals 4 and 4' forming a direct communication between the inlet pipe for cold water and the outlet pipe 6, while the openings 5 and 5' form a direct communication between the inlet hot water pipe 3 and the outlet pipe 7.

It will be noted that the pipes 6 and 7 are integrally formed and provide a single outlet for either hot or cold water or both. Mounted within the body 1 for rotary and reciprocating movement, is a valve 8, the lower end of which is provided with a tapering annular flange 9 adapted to engage a tapering shoulder 10 formed within the body 1 to limit the upward movement of the valve. It will be noted that in placing this valve in position, the upper end thereof is inserted up through the body 1 and a cap 11 is mounted thereon and securely retained in position by means of a set screw 12 whereby the valve may be either rotated or reciprocated, as desired.

The lower end of the body 1 is closed by means of a cap 13 and forms a suitable receptacle for a helical spring 14, arranged beneath the lower end of the valve 8, whereby to normally retain the valve in its raised position. Extending transversely through the valve member 8 in parallel relation to each other, are the openings 15 and 16, the opening 15 being adapted to establish communication between the pipes 2 and 6, the opening 16 at the same time effecting communication between the pipes 3 and 7, whereby as best shown in Fig. 1 both hot and cold water may be discharged through the nozzle end of the pipes 6 and 7.

It will now be seen particularly upon reference to Fig. 3 that the plane of the openings 17 and 18 intersects the plane of the openings 15 and 16 at right angles and that these openings are of less diameter than the cord of the segments which separate them. Thus, from the position shown in Fig. 1, the valve may be rotated through an arc slightly less than 90° and disposed to seal the openings 2 and 3. From the closed position of the valve, it may be further rotated to establish communication between the passages 2 and 6 by bringing the opening 17 in alinement with the openings 4 and 4'. In this position of the valve only cold water will be discharged from the nozzle. If it is desired to discharge only hot water, the valve may be depressed against the tension of the spring 14, from the position in which the passage 17 alines with the openings 4 and 4'. The depression of the valve will bring the terminals of the opening 18 into alinement with the openings 5 and 5'.

From the above it will be apparent that I have provided a simple and durable faucet whereby either hot or cold water or a mixture of both may be discharged, as desired. It will also be noted that by having the valve member 8 removable, through the medium of the cap 13, it can be readily cleansed or repaired. The device, as a whole, is extremely simple in construction and can be manufactured and placed upon the market at a comparatively low cost.

In Fig. 6, I have illustrated a slightly modified form of the invention, wherein the valve member is provided with spaced openings 19 and 20, the opening 19 when arranged in operative position, is disposed in alinement with the pipes 2' and 6', while the opening 20, when arranged in position is disposed in alinement with the openings 3' and 7'. This arrangement provides for the discharge of both hot and cold water but, should it be desired to discharge either hot or cold water alone, the valve is given a half turn so that the opening 17' is arranged in alinement with the openings 2' and 6' wherein only cold water will be discharged, while if it is desired to discharge hot water the valve is pressed downwardly against the tension of the spring 14' to bring the opening 17' in alinement with the openings 3' and 7'. This form of the invention can, if desired, be used in place of the preferred form.

While I have shown and described the preferred form of my invention, it will be obvious that various changes in the details of construction and in the proportions may be resorted to for successfully carrying my invention into practice, without sacrificing any of the novel features, or departing from the scope of the invention, as defined by the appended claims.

Having thus described this invention, what I claim is:—

1. In a valve for controlling two independent conduits, a body member having transverse openings leading into said conduits, a valve mounted in the body, said valve being provided with two pairs of opposed passages, said valve being rotatable for disposing the first pair in alinement with the transverse openings of the body and being further rotatable for sealing said first pair of openings with respect to the transverse passages of the body, and being further rotatable for bringing one of the openings of the second pair into registration with one of said transverse openings, whereby one of said conduits is opened and the other of said conduits is sealed, said valve being also reciprocable against the tension of the spring for sealing the first conduit and opening the second conduit by bringing the other passage of the second mentioned pair into registration with the transverse opening which leads into the second conduit.

2. A device of the class described including a hollow body member having alined openings formed in opposite sides thereof, inlet pipes communicating with the openings at one side thereof, outlet pipes communicating with the openings on the opposite side, a valve member movably mounted within said body and provided with spaced parallel openings adapted to form communication between both the inlet pipes and the outlet pipes, said valve member being further provided with a second set of spaced openings extending at right angles to the first openings, whereby upon the rotation of said valve, one of the openings will form communication between one of the inlet and one of the outlet pipes and whereby reciprocating movement of said valve after such rotation will bring the second opening of the second set into alinement with the other inlet and outlet pipe.

3. A device of the class described including a hollow body member, a valve member mounted for rotary and reciprocating movement therein, said valve being provided with angularly related spaced openings, and a coil spring disposed beneath said valve member, as and for the purpose set forth.

4. A device of the class described including a hollow body member having spaced openings formed in the opposed walls thereof, inlet pipes connecting with one set of openings and outlet pipes connecting with the other set of openings, a valve member mounted within said body for rotary and reciprocating movement, said valve member having spaced openings extending transversely therethrough, whereby upon rotary movement of the valve, said openings will form communication between both the inlet pipes and both the outlet openings, said valve being further provided with a second set of openings extending at right angles to the first openings, and arranged in position whereby upon rotary and reciprocating movement of the valve, each of the inlet and outlet pipes will be brought into alinement, one at a time.

In testimony whereof I hereunto affix my signature in the presence of two witnesses.

GUST EKONOM.

Witnesses:
ARTHUR S. ATKINS,
EDW. D. CURRIN,